United States Patent Office 3,825,596
Patented July 23, 1974

---

3,825,596
PROCESS FOR PREPARATION OF N,N-DIALKYL TOLUAMIDE
Taketosi Naito, Kawasaki, and Masatomo Ito, Yokohama, Japan, assignors to Showa Denko Kabushiki Kaisha, Tokyo, Japan
No Drawing. Filed May 23, 1972, Ser. No. 256,116
Int. Cl. C07c 103/22
U.S. Cl. 260—558 R                3 Claims

ABSTRACT OF THE DISCLOSURE

N,N-Dialkyl-m(or p)-toluamide can be produced by reacting m(or p)-tolunitrile with di- or trialkylamine and water in the liquid phase. Remarkably superior results can be obtained by using specific compounds as catalysts and/or removing ammonia formed during the reaction from the system.

---

This invention relates to a process for the preparation of N,N-dialkyl-m(or p)-toluamides, and more particularly to a process for the preparation of N,N-dialkyl-m(or p)-toluamides comprising reacting m(or p)-tolunitrile with a dialkylamine, a trialkylamine or mixture thereof and water in the liquid phase.

It has hitherto been known that N,N-dialkyl-m-toluamides are useful compounds as agricultural agents and insecticides, and especially N,N-diethyl-m-toluamide is a very effective mosquito repellant. It has been recorded in the literature that these compounds can be prepared by the reaction of m-toluic acid chloride with dialkylamines.

As for improved processes for the preparation of N,N-diethyl toluamide, U.S. Pats. 2,932,665 and 3,198,831 disclose processes for reacting toluic acid with diethylamine in the vapour phase. These processes are based on a dehydration reaction, and are carried out in the presence of a dehydrating catalyst. These processes, however, can hardly be called industrially truly satisfactory processes. One reason is that since the raw material toluic acid is solid at room temperature, problems occur in operation of the reaction unlike the case where the raw materials are liquid. Another reason is that the toluic acid may be obtained by hydrolyzing tolunitrile by the use of acid or alkali, but at that time a considerably large amount of acid or alkali is consumed—this is economically disadvantageous.

It has now been discovered that the desired N,N-dialkyl-m(or p)-toluamide (which will hereinafter be referred to simply as toluamide; alkyl means an alkyl having 1-4 carbon atoms) can be produced conveniently by reacting m(or p)-tolunitrile (which will hereinafter be referred to simply as tounitrile) with a di- or trialkylamine in the liquid phase. No such process for preparing N,N-dialkyl-m-toluamide directly from tolunitrile has hitherto been known. The raw material tolunitrile can be obtained cheaply as a by-product in the manufacture of, e.g., isophthalonitrile from xylene by the ammoxidation reaction, and unlike toluic acid, it is liquid at room temperature, and can be handled, transported and weighed easily, and is industrially advantageous. The process of the present invention has a further advantage that it does not require any preliminary step for the preparation of toluic acid or toluic acid chloride or any auxiliary raw materials which are required in the known processes. In addition, the dialkylamine, trialkylamine or mixture thereof can be used as the other raw material alkylamine, and the presence of a small amount of monoalkylamine is allowable since it does not hamper the reaction. Industrially, alkylamines are produced by the reaction of the corresponding alcohols with ammonia, and the product is a mixture of dialkylamine and trialkylamine containing a small amount of monoalkylamine. Accordingly, the process of the present invention can use such industrial product without any modification.

The principal reactions in the process of the present invention may be expressed by the following two equations.

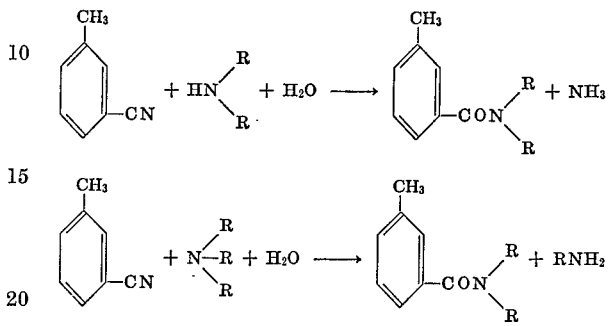

(wherein R is an alkyl radical). As shown above, neither of these reactions is a dehydration reaction, but water participates in the reactions as a reactant.

The present invention provides a process for the preparation of N,N-dialkyl toluamides which comprises reacting tolunitrile with an alkylamine selected from the group consisting of dialkylamine, trialkylamine and mixtures thereof (wherein the alkyl contains 1-4 carbon atoms) and water at a temperature of 100-400° C. in the liquid phase.

In the process, the reaction rate becomes too low if the temperature is less than 100° C., and the amount of formation of N-monoalkyl toluamide as a by-product increases if the temperature exceeds 400° C., and so these temperatures are not desirable. The most preferable reaction temperature range is from 200 to 350° C. The pressure to be used is a pressure capable of maintaining the reactants in a liquid phase. Usually, the reaction is carried out under a pressure occurring spontaneously in correspondence to the reaction temperature applied, and this pressure somewhat changes with the progress of the reaction.

No critical limitation is placed on the ratio of the starting materials, but usually about 0.8–3 mols of alkylamine per mol of tolunitrile are used. If the amount of alkylamine is too small, unreacted tolunitrile is left behind. No harm is done if the amount of alkylamine is excessive, but no particular advantage is obtained if more than 3 mols are used. It is preferable to use 1–1.5 mols of alkylamine per mole of tolunitrile. Water, the other starting material, is usually used in an amount of 0.8–5 mols per mol of tolunitrile. If the amount of water is too small, the reaction rate lowers and unreacted tolunitrile remains, and if it is excessive, the amount of by-product toluamide increases. The preferable amount of water to be used is 1–2 mols per mol of tolunitrile.

The reaction may be carried out in the absence of a catalyst, but it has been discovered that certain compounds have an effective catalytic action on this reaction. Accordingly, it is advantageous to carry out the reaction in the presence of a catalyst from the practical point of view. Compounds which have been found to have effective catalytic action are inorganic acids, organic acids, organic acid salts of metals, metal halides, and peroxides. Such inorganic acids include hydrochloric acid, sulphuric acid and phosphoric acid, and the organic acids include acetic, acid, benzoic acid and toluic acid. As such organic acid salts of metals, acetates of copper, zinc, cadmium, mercury, nickel, cobalt and lead may be mentioned especially. As such metal halides, chlorides of the above metals may be mentioned. The peroxides include hydrogen peroxide and benzoyl peroxides. These compounds differ in catalytic action characteristics. The metal acetates have the most superior catalytic activity and selectivity, and especially acetates of lead, zinc and cadmium are most preferable. The activity of the peroxides is somewhat lower than those of the acetates, but they have high selectivity and are satisfactory for use. The metal halides have higher activity than the peroxides, but are low in selectivity, and the acids generally do not exhibit sufficiently high activity.

These catalysts act effectively even in a small amount, and it suffices if they are present in an amount of about 0.001–10 mol percent based on the raw material tolunitrile. No special advantage is obtained if they are used in excess. Usually, it is preferable to use them in an amount of 0.1–5 mol percent based on the toluamide.

It has been discovered further that according to the present invention, the reaction rate is increased and the desired N,N-dialkyl toluamide can be produced with still higher yield by practicing the reaction of tolunitrile with alkylamine and water while removing the ammonia formed with the progress of the reaction from the reaction system.

This means achieves the effects sufficiently when the reaction is carried out in the absence of catalyst, too, and if this means is employed when the reaction is carried out in the presence of catalysts, remarkably superior effects can be achieved, and this is the most preferred embodiment of the present invention.

The ammonia may be removed intermittently or continuously during the progress of the reaction, and since ammonia has the highest partial pressure of all the reactants and products, it is easy to lead it alone out of the reaction system while keeping it gaseous. For example, if only the reaction vessel is cooled from the outside at certain intervals of time during the progress of the reaction and then an exhaust valve attached to the reactor is opened, the greater part of the ammonia formed till then is easily removed out of the reactor in gaseous form. Then, the reactor is heated again to the predetermined temperature, and the reaction is continued. Thus, the reaction and the removal of ammonia can be repeated alternately. Alternatively, ammonia may be removed continuously during the progress of the reaction through an exhaust valve or nozzle attached to the reactor. In this case, care must be taken so that the exhaust valve or nozzle may be opened narrow enough to maintain the pressure inside the reactor at a level capable of keeping the reactants liquid. It is preferable to place, e.g., a water-cooled condenser between the nozzle and the reactor in order to reflux the reactants which may be entrained by the ammonia back to the reactor.

The process of the present invention may be practiced either batchwise or by a continuous system. The batchwise reaction time depends on the temperature employed, whether a catalyst is present or not, whether the by-product ammonia is removed or not, etc., but usually it is about 2–12 hours.

The present invention will be illustrated by means of Examples below. The percentage appearing therein is percentage by weight, unless otherwise provided. The abbreviations used are as follows:

T.N.: m-tolunitrile.
D.T.A.: N,N-diethyl-m-toluamide.
M.T.A.: N-monoethyl-m-toluamide.
T.A.: m-toluamide.

EXAMPLE 1

A 300 cc. autoclave with a stirrer was charged with 39.1 g. of m-tolunitrile (T.N.), 26.8 g. of diethylamine and 6.0 g. of water, and after the air inside the autoclave was replaced by nitrogen gas, the reaction was carried out at 230° C. for 4 hours. On cooling the reaction mixture and analyzing it by gas chromatography, it was found to contain 45.1% of unreacted T.N., 2.6% of N,N-diethyl-m-toluamide (D.T.A.) and 7.9% of m-toluamide (T.A.). The yield of D.T.A. in this reaction (calculated on the basis of the raw material tolunitrile; the same shall apply hereinafter was 3 mol percent.

EXAMPLE 2

The procedure of Example 1 was followed, except that 10 mol percent, based on m-tolunitrile, of zinc chloride was used as the catalyst.

The reaction product contained 3.1% of T.N., 16.3% of D.T.A., 8.1% of N-monoethyl-m-toluamide (M.T.A.) and 37.1% of T.A. The yield of D.T.A. in this reaction was 19.0 mol percent.

EXAMPLE 3

The procedure of Example 1 was followed, except that 5 mol percent of mercuric chloride was used as the catalyst and the reaction temperature was 280° C.

The reaction product contained 4.2% of T.N., 13.4% of D.T.A., 35.7% of M.T.A. and 22.1% of T.A. The yield of D.T.A. was 14.4 mol percent.

EXAMPLE 4

The same reactor as in Example 1 was charged with 29.3 g. of m-tolunitrile, 91.4 g. of diethylamine, 4.5 g. of water and 2 mol percent of hydrogen peroxide (catalyst), and the reaction was carried out at 300° C. for 7 hours.

The reaction product contained 5.4% of T.N., 15.5% of D.T.A., 3.9% of M.T.A. and 3.4% of T.N. The yield of D.T.A. was 44 mol percent.

EXAMPLES 5–10

The procedure of Example 1 was followed except that 1 mol percent of the compound mentioned in the following Table was used as the catalyst. The results were as shown in the Table.

| Example | Catalyst | Percent T.N. | Percent D.T.A. | Percent M.T.A. | Percent T.A. | Yield of D.T.A. (mol percent) |
|---|---|---|---|---|---|---|
| 5 | Benzoyl peroxide | 22.8 | 11.1 | Trace | 27.8 | 12.7 |
| 6 | Hydrochloric acid | 39.5 | 7.0 | Trace | 6.2 | 8.7 |
| 7 | Cadmium acetate | 6.8 | 21.7 | 1.7 | 36.3 | 25.6 |
| 8 | Lead acetate | 4.3 | 27.3 | 1.9 | 42.4 | 24.1 |
| 9 | Zinc acetate | 3.7 | 24.3 | 1.4 | 41.4 | 41.4 |
| 10 | Copper acetate | 8.0 | 12.8 | 1.1 | 49.8 | 13.1 |
| 11 | Cobalt acetate | 7.2 | 18.6 | 0.9 | 42.2 | 20.3 |
| 12 | Nickel acetate | 36.0 | 5.0 |  | 16.7 | 5.8 |
| 13 | Benzoic acid | 38.2 | 5.2 |  | 13.2 | 6.1 |
| 14 | Sulphuric acid | 40.3 | 6.4 | Trace | 5.9 | 7.9 |
| 15 | Phosphoric acid | 41.2 | 5.7 | Trace | 7.0 | 6.9 |
| 16 | Acetic acid | 44.4 | 4.1 | Trace | 7.3 | 4.7 |
| 17 | m-Toluic acid | 42.6 | 3.4 | Trace | 7.9 | 4.1 |
| 18 | Cadmium chloride | 9.5 | 12.3 | 7.0 | 35.9 | 13.8 |
| 19 | Cobalt chloride | 12.8 | 10.9 | 5.6 | 33.1 | 12.8 |
| 20 | Cupric chloride | 17.7 | 8.8 | 5.1 | 31.8 | 9.9 |

EXAMPLE 21

The reactor of Example 1 was charged with 39.1 g. of m-tolunitrile, 37.2 g. of triethylamine, 6.0 g. of water and 1 mol percent of zinc chloride (catalyst), and the reaction was carried out at 280° C. for 4 hours.

The reaction product contained 4.9% of T.N., 10.0% of D.T.A., 28.4% of M.T.A. and 9.0% of T.A., and the yield of D.T.A. was 15.5 mol percent.

EXAMPLE 22

The procedure of Example 1 was followed, except that 39.1 g. of p-tolunitrile were used instead of m-tolunitrile the raw material, and 1 mol percent of lead acetate was used as the catalyst.

The reaction product contained 4.1% of p-tolunitrile, 31.4% of N,N-diethyl-p-toluamide, 1.8% of N-monoethyl-p-toluamide and 38.5% of p-toluamide, and the yield of N,N-diethyl-p-toluamide was 33.1 mol percent.

EXAMPLE 23

The reactor of Example 1 was charged with 58.5 g. of m-tolunitrile, 4.5 g. of monoethylamine, 21.9 g. of diethylamine, 15.2 g. of triethylamine, 9.0 g. of water and 1 mol percent of lead acetate (catalyst), and the reaction was carried out in the same manner as in Example 1.

The reaction product contained 4.4% of T.N., 17.1% of D.T.A., 11.5% of M.T.A. and 36.3% of T.A., and the yield of D.T.A. was 11.1 mol percent.

EXAMPLE 24

The procedure of Example 1 was followed, except that a water condenser having a needle valve at its tip end was attached to the reactor, and the ammonia gas formed with the progress of the reaction was removed out of the system continuously.

The reaction product contained 41.4% of T.N., 14.3% of D.T.A., 1% of M.T.A. and 3.6% of T.N., and the yield of D.T.A. was 23.4 mol percent.

EXAMPLE 25

The procedure of Example 1 was followed, except that 1 mol percent of benzoyl peroxide was used as the catalyst and the reaction temperature was 280° C.

The reaction product contained 6.4% of T.N., 33.7% of D.T.A., 3.0% of M.T.A. and 25.3% of T.A., and the yield of D.T.A. was 40.3 mol percent.

EXAMPLE 26

The same raw material composition as the in Example 1 was used, 1 mol percent of benzoyl peroxide was used as catalyst, the reaction was carried out at 250° C., and at intervals of 1.5 hours the reactor was cooled rapidly and the ammonia gas formed was discharged, and then the reactor was heated again to 250° C. to resume the reaction—this operation was repeated 8 times. (The reaction time was 12 hours in total.)

The reaction product contained 2.4% of T.N., 60.8% of D.T.A., 3.2% of M.T.A. and 16.9% of T.A., and the yield of D.T.A. was 65.7 mol percent.

EXAMPLE 27

The same raw material composition, catalyst and reaction temperature as those of Example 26 were adopted, and the reaction was carried out for 5 hours while removing the gas formed out of the system continuously in the same manner as in Example 24.

The reaction product contained 3.0% of T.N., 75.0% of D.T.A., 3.3% of M.T.A. and 6.5% of T.A., and the yield of D.T.A. was 85.2 mol percent.

EXAMPLE 28

The procedure of Example 8 was followed, except that the evolving gas was removed continuously in the same manner as in Example 24.

The reaction product contained 2.7% of T.N., 84.8% of D.T.A., 9.3% of M.T.A. and 2.0% of T.A., and the yield of D.T.A. was 90.7 mol percent.

We claim:

1. A process for the preparation of a N,N-dialkylmeta (or para)-toluamide, which comprises reacting meta (or para)-tolunitrile with a dialkylamine, wherein the alkyl group contains 1 to 4 carbon atoms and water in the liquid phase at a temperature of 200–350° C., the reaction being carried out in the presence of a catalyst comprising at least one compound selected from the group consisting of hydrochloric acid, sulfuric acid, phosphoric acid, acetic acid, benzoic acid, metal-toluic acid; acetates and chlorides of copper, zinc, cadmium, mercury, nickel, cobalt and lead; hydrogen peroxide and benzoyl peroxide, while removing from the reaction system the ammonia formed with the progress of the reaction, the amount of the dialkylamine used being 0.8–3.0 mols and the amount of water used being 0.8–5.0 mols per mol of tolunitrile used, the amount of catalyst used being 0.001–10.0 mol percent based on the weight of the tolunitrile.

2. The process of claim 1 wherein the amount of catalyst is 0.1–5 mol percent based on the tolunitrile.

3. The process of claim 1 wherein the amount of the alkylamine is 1–1.5 mols and the amount of water is 1–2 mols per mol of tolunitrile.

References Cited

UNITED STATES PATENTS

| | | | |
|---|---|---|---|
| 2,820,801 | 1/1958 | De Benneville et al. | 260—558 |
| 2,476,500 | 7/1949 | Mahan | 260—558 |

FOREIGN PATENTS

| | | | |
|---|---|---|---|
| 19,882 | 7/1970 | Japan | 260—561 |

HARRY I. MOATZ, Primary Examiner

UNITED STATES PATENT OFFICE
CERTIFICATE OF CORRECTION

Patent No. 3,825,596     Dated July 23, 1974

Inventor(s) TAKETOSI NAITO ET AL

It is certified that error appears in the above-identified patent and that said Letters Patent are hereby corrected as shown below:

In the Heading, insert patentees' foreign application priority data as follows:

-- Claims priority, application Japan, No. 35487/71, May 26, 1971. --

Signed and sealed this 6th day of May 1975.

(SEAL)
Attest:

RUTH C. MASON
Attesting Officer

C. MARSHALL DANN
Commissioner of Patents
and Trademarks